Nov. 4, 1969  N. FLEISCHMANN  3,476,634
HEAT AND SOUND INSULATION
Filed Nov. 17, 1964

INVENTOR
NICHOLAS FLEISCHMANN
BY
Richards and Cifelli
ATTORNEYS

United States Patent Office 3,476,634
Patented Nov. 4, 1969

3,476,634
HEAT AND SOUND INSULATION
Nicholas Fleischmann, 7 Downage, Henden,
London NW. 4, England
Filed Nov. 17, 1964, Ser. No. 411,897
Claims priority, application Great Britain, Nov. 19, 1963,
45,633/63
Int. Cl. B32b 3/16
U.S. Cl. 161—38                                9 Claims

ABSTRACT OF THE DISCLOSURE

Heat and sound insulating sheet building materials useful as floor, wall and other surface coverings are described, which are composed of facing units of wood or other materials asembled into a sheet held together by a flexible, resilient foamed plastic backing layer having a skin surface. Metal fastening means for joining sheets of the new materials together at their edges, and the method of manufacturing the new insulating sheets by heating in a mold are also described.

---

Figure 1A:
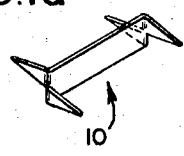
Figure 1B:
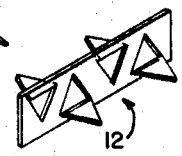
Figure 1C:
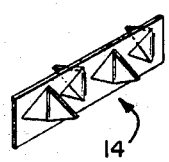
Figure 1D:
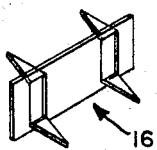

This invention relates to heat and sound insulation in building constructions and one object of the invention is to produce a floor finish which will be an effective insulator against impact noise without requiring considerable thickness of flooring foundation and similarly to produce wall panelling and partitions which will provide impact sound insulation between adjacent rooms without occupying as much space as a dividing wall of conventional construction.

The invention will be described in relation more particularly to tiles and wooden floor coverings, blocks or fingers which may be used as floorings or wall tiles or wall panelling of buildings and will be referred to hereinafter as "floor and wall covering facing units." Such units when laid on a rigid base such as concrete, steel or wood, will form an effective barrier again impact noises. It will, however, be appreciated that the invention may be applied to any other structural sub-base and while the invention is mainly concerned with noise reduction it will be found equally useful for producing thermal insulation units eliminating the cumbersome sandwich and cavity construction.

It has been found that if the underside of a flooring or wall covering unit has firmly united with it a comparatively thin layer of skin-enclosed or skin-covered foamed plastic this will form an effective barrier against impact sounds and provide heat insulation so that considerable space is saved in the construction of the walls and floors and partitions of buildings.

The formation of a foamed synthetic resin by incorporating with a polymeric material before or during the polymerisation process a substance (blowing agent) which under the conditions of the polymerisation will form an inert gas such as carbon dioxide or nitrogen is well known, but the properties required in a foam for the purpose of the present inventiion are difficult to produce. It must be sufficiently strong to prevent crushing of the cellular structure, it must create its own skin cover while firmly uniting with the floor or wall covering unit and be sufficiently stable to retain its properties more or less indefinitely.

It has been found that a highly modulus flexible and an elastic semi-rigid polyurethane foam fulfills these conditions but a rigid polyurethane foam may be used in the case of wall and partitions covering intending to serve thermal insulation.

According to the invention a floor or wall covering unit, as hereinbefore defined, is provided, on the side which is to contact a supporting base or backing, with an elastic polyurethane foam which is skin covered and is firmly attached to said unit.

It is essential for floor coverings that the polyurethane foam should be what is known in commerce as high modulus flexible or semi-rigid foam.

For the purpose of the invention as applied to floor units a suitable polyurethane foam may be obtained by formulating a semi-rigid or semi-flexible foam based on a polyether-polyol or polyester-polyol resin in reaction with a diisocyanate e.g. toluene (Tolylene or M.D.I.) diisocyanate and the carbon dioxide formed by the reaction of water with the diisocyanate acts as principal blowing agent. By varying formulations to suit construction, loading and user requirements there may be produced a foam which, while having the required flexibility to take up the energy of impact and act as an effective noise insulator or reducer, will nevertheless be strong enough to resist crushing or undue compression under loading.

One particularly useful form of the invention comprises a wood board on the underside of which a skin covered polyurethane foam has been formed.

Preferably the wood has undergone a stabilising treatment as hereinafter described by heating it in a mineral oil until all volatile constituents of the wood have been driven out.

The stabilization of some woods employed for the purpose of the present invention is important in order that there may be no warping of the wood during the hot curing of the chemical foam. This may be accomplished by assembling segments, sections, fingers or laths in alternate layers with the grain running at right angles and clamping the assembly together and immersing it in a hot mineral oil solution between 100° C. and 150° C. for a period of 3 to 10 minutes. This stabilisation to be carried out on the sections, segments, fingers etc. prior to manufacturing and assembling with chemical foams.

Alternatively the wood may be constructed by interconnecting wooden laths into panel form and driving clips of undulated outline into adjacent portions and stabilizing the panel in a manner described in United Kingdom Patent No. 811,655.

While the prestabilisation of timber in the manner described is desirable to obtain the best quality, it has also been found possible to organise the application of foam to unstabilised wood and structural timbers, by pre-warming the timber and or the mould and obtaining a rapid curing of the foam by using microwave or dielectric heat, or a rapid self-curing foam mixture, and thus radically to shorten the time of curing under heat, during which the timber can be adversely affected. The cracks which may be formed through the sudden application of heat to unstabilised, stabilised, preheated or non-preheated wood, will be filled and sealed by the foaming mixture while in its liquid state pressurised within the mould.

The invention includes a method of producing a floor or wall covering unit according to which a title or wood board or block or an assembly of fingers is laid on the bottom of a mould suitably dimensioned to allow of sufficient space to form a foam of the required thickness above the unit. Sufficient of the mixture of polyether/polyester polyol based product and the isocyanate and blowing agent and other ingredients are introduced enabling contact with the surface of the unit, calculated to form the required thickness and density of the foam and fill the mould. The mould is then closed and the polymethane-forming mixture cured. Under the influence of the blowing agent the foam will be formed and after curing will be found firmly fixed to the wood, board or other unit.

The thickness of the foam may be varied to suit the actual requirement and density.

In producing a flooring unit according to the invention by the method above described the mixture for forming the plastic foam may consist of a polyether-polyol or polyester-polyol, a diisocyanate and water together with a surface-active agent such as silicone oil and catalysts hereinafter referred to as the "foaming mixture." A suitable catalytic agent is a tricyclic amine as sold under the trade name "Dabco" which is used in conjunction with stannous octoate, the proportions of the two catalysts and service-active agent being adjusted to give the required strength and density of the foam. Other ingredients e.g. foam modifiers such as Technical glycerol or fillers may be incorporated. Sufficient of the foaming mixture is deposited over the surface of the tile, wood board, block or panel to form the required thickness and density of the foam, and to set up a degree of pressure within the mold when closing, the pressure being the result of the foaming of the plastic by the blowing agent. The mould may be adapted so that the floor and wall covering unit may stand vertically for the foam to be created alongside the unit, or horizontally so that the unit is above the polyurethane foaming mixture, which in the closed mould would rise up to the unit above it. Large sheets e.g. plywood, particle board, steel sheet floor plates may be processed on the flow-principle, foam mixture being continuously deposited on to the sheet material passing on conveyors overhung by suitable paper rolling parallel overhead under containing support. Where a sandwich structure is required e.g. in partitioning rooms, two veneers or other layers may be introduced into the mould and the polyurethane foaming mixture introduced in between the two so that when the foam is formed it will be firmly united with both veneers thus forming an adeal partitioning material of minimum thickness but with good sound insulation.

It is further claimed that by fixing tongues and grooves at the end grain and along the long grain formed either in the material itself or through the insertion of tongues of wood, metal, or other materials, in slots in correspondence situated near the underside of the wood, uneven loading of the foam can be prevented, and the insulating properties of the foam preserved for an unlimited period.

Timbers or other floor or wall covering units so backed with chemical foam may be stuck direct to ships' steel decking, to unscreeded rough level concrete, rough wooden or steel floors, and to any other structural subbase. It may also be used for internal cladding, wall and floor panelling and tiling, skirting boards, windowsills, and for cladding of such structural materials as doors, posts, frames and columns.

The foam material may be coloured to simulate the colour of the particular unit to which it forms a backing so that any slight exudation of the backing material may be unobservable or inconspicuous.

In order to apply the invention described commercially it is highly desirable to produce the material in large units, possessing an ability to cope with building tolerances, and tolerances imposed by materials used. This is especially important when preparing panelling units where individual tiles or like units of comparatively small area are to be assembled and to be fixed to accurate levels, though working off uneven substrates. When a large unit is made up of small units such as tiles, or small fingers of wood, or small squares of wood or mosaic, or slips of slate by applying the foam to the backs of the units so that the units are united by a common backing of foam, there is a tendency for such large units to bend when lifted up, or fixed to not fully supporting substrates owing to a hinging action between adjacent units and it is accordingly desirable to reinforce the assembly to make it substantially rigid against bending.

The invention therefore includes a method of making large building units such as floorings or wall panels from small units above described, comprises assembling the said small units face downwards within a frame mould suitably dimensioned to allow sufficient space to form the foam on the reverse side of the building unit, placing on the backs of the units a perforated rigid sheet, which may conveniently be of fibre board, metal, plywood, polystyrene or other rigid material and pouring the foaming mixture over the perforated sheet closing and clamping down the cover of the mould and allowing the foaming mixture to react as described whereby the foaming mixture penetrates the perforations of the perforated sheet and forms a union between the backs of the tiles or other units and the foamed layer so that the whole is converted to a rigid structure.

The foaming mixture and the method of applying it to the perforated sheet is otherwise the same as that described for applying the foaming mixture to the back of a single unit, with the following additions:

(a) The need for thermal curing appliances and processes can be reduced or eliminated by using self-curing or thermally assisted curing foams;

(b) It may be advantageous to use what is called a mould liner film which is so placed in relation to the foaming mixture that when the foam is formed and presses against the mould closure the intervening film prevents any sticking and enables the moulding to be removed from the mould as soon as the foam has gelled.

The employment of a perforated rigid sheet to stiffen the large building units according to the invention opens up the possibility of a number of ways in which these large units may be fixed to uneven walls or floors. For instance, two sides at right angles of the perforated reinforcement and its foamed backing may be made to protrude beyond the facing tile or panel while on the opposite two sides it may be made to recede a corresponding distance. The two protruding sides may then be fixed over the high point of the uneven wall, for instance by screws, filling the cavity with additional insulation materials, and then the receding backing of an adjacent large unit can then be adhesively attached to the protruding backing of the first unit, and similarly for units which are to be built above the first row of units. The protrusion can be similarly used to support the assembly laid to the high point of an uneven floor, while the cavity can be filled in by dry sand, placed or blown into the hollow under.

Foam backed structural timber or panel or sheet used as load bearing subfloor or floor, and spanning between beams or joists or walls can furthermore be interconnected without tongue and groove by securing neighbouring boards or planks with a multidirectional nail hereinafter described, and which may be produced in any size to suit the needs of this type of construction.

The accompanying drawing illustrates how a floor may be constructed from a number of units as hereinbefore described using multidirectional nails of different forms in order to prevent uneven loading of the foam of heavy articles such as the legs of heavy furniture are placed on the edge of a single unit.

In the drawing FIGURE 1 shows in perspective four different types of multidirectional nails which may be stamped out from steel sheet. The simplest form is shown in FIGURE 1 in which 10 is a strip of steel sheet which has been slit horizontally and a triangular piece cut out from each corner of the strip to the extremity of the horizontal cut and the two pointed ends thus produced are bent at right angles in opposite directions. The strip 12 has cuts made forming two sides of an equilateral triangle and the triangular pieces so formed are bent outwardly in opposite directions to form horizontal points. The strip 14 is a similar construction with vertical points and the strip 16 is formed by two parallel cuts and a diagonal cut and the two triangular pieces thus formed are bent outwardly in opposite directions to form horizontal points.

Figure 2:
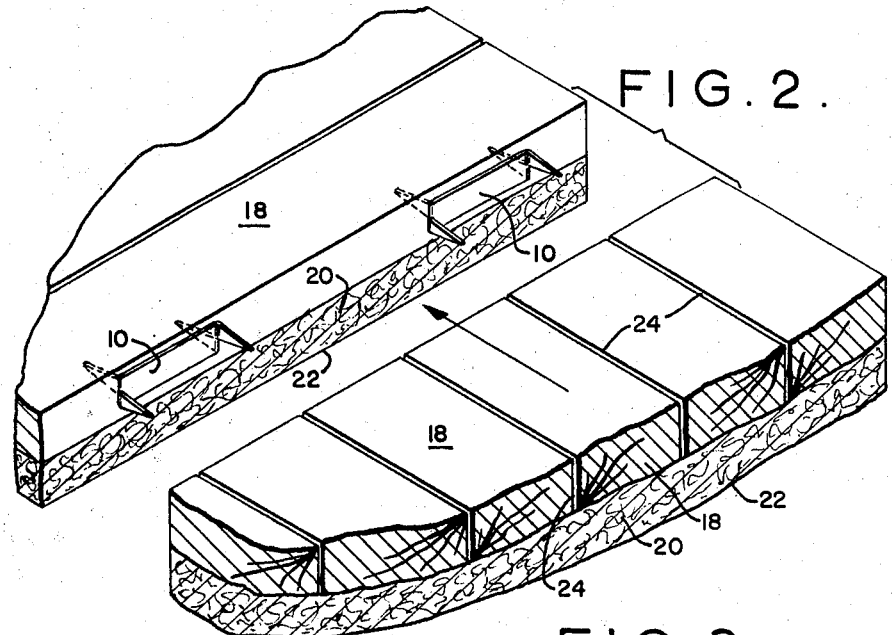
Figure 3:
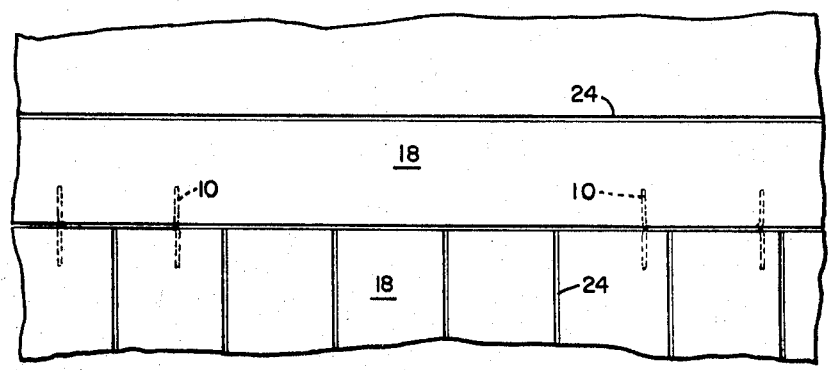

FIGURE 2 shows in perspective the nail 10 of FIGURE 1 in position in embedded in the wood portion 18 a floor unit ready to be united to another unit and FIGURE 3 shows a plan view of the united sections. The underlying foam 20 and skin 22 on the foam may be seen in FIG-URE 2.

The spaces 24 between wood strips, fingers or facing units 18 have been exaggerated for purposes of illustration, since the adjacent strips are preferably, but not necessarily, in contact with each other.

It will be appreciated that the above is given by way of example only and that there are many other ways of cutting slots in a strip of steel and bending tongues so formed to give pointed projections on both sides.

I claim:

1. A thermal and sound insulating construction material in sheet form comprising a plurality of individual facing units each having a facing surface and a rear surface, said facing units being disposed in edge to edge relation with their collective facing surfaces making up the facing surface of said sheet construction material, and a backing layer of elastic skin-enclosed synthetic plastic foam material, one skin surface of said plastic material being bonded to the rear surfaces of said facing units.

2. A thermal and sound insulating sheet construction material according to claim 1, wherein the backing layer is composed of skin-enclosed polyurethane foam material selected from the group consisting of high modulous flexible polyurethane foam and semi-rigid polyurethane foam.

3. A thermal and sound insulating sheet construction material according to claim 1, wherein the facing units are composed of wood stabilized by heating in mineral oil until substantially all volatile constituents of the wood have been removed.

4. A rigid thermal and sound insulating construction material according to claim 1 comprising a rigid perforated sheet member disposed between the rear surfaces of said facing units and said backing layer, the elastic skin-enclosed synthetic plastic foam material of said backing layer protruding through the perforations in said rigid sheet and being bonded to the rear surfaces of said facing units, to provide a rigid integral sheet construction material.

5. A method of the manufacture of a thermal and sound insulating construction material in sheet form comprising placing a plurality of individual facing units, each having a facing surface and a rear surface, face down in the bottom of a mold suitably dimensioned to provide space to form a foam layer above the facing units, said facing units being disposed in edge to edge relation with their collective facing surfaces making up the facing surface of the sheet of construction material to be formed, forming a layer of a foamable synthetic resinous composition containing a blowing agent, polymerization catalyst, and activator for the blowing agent, in said mold over the rear surfaces of said facing units closing the mold and curing the foamable resinous composition to produce a stable, skin-enclosed foam backing layer bonded to the rear surfaces of said facing units.

6. The method according to claim 5, wherein curing is effected by the application of radiant energy selected from the group consisting of microwave energy and dielectric heat energy.

7. The method according to claim 5, wherein said layer of foamable synthetic resinous composition is a rapid self-curing mixture not requiring the application of heat for curing.

8. The method according to claim 5, wherein said layer of foamable synthetic resinous composition is a rapid thermally assisted curing mixture.

9. A method for the manufacture of a thermal and sound insulating construction material in relatively large sheet form comprising placing a plurality of smaller sheets, face down in the bottom of a mold suitably dimensioned to provide space to form a foam layer above said smaller sheets, said smaller sheets being disposed in edge to edge relation with their collective facing surfaces making up the facing surface of said large sheet of construction material to be formed placing a rigid perforated sheet member above the plurality of smaller sheets in the mold so as to rest on the rear surfaces of said smaller sheets, and forming a layer of a foamable synthetic resinous composition containing a blowing agent, polymerization catalyst, and activator for the blowing agent in said mold over the rigid perforated sheet member and rear surfaces of said smaller sheets, closing the mold and curing the foamable resinous composition, whereby the foamable composition penetrates the perforations in said perforated sheet and forms a unifying bond between the areas of said rear surfaces of the smaller sheets thus contacted and the resulting stable, skin-enclosed foam backing layer, thus producing an integral, rigid building unit; each smaller sheet comprising a plurality of individual facing units each having a facing surface and a rear surface, and disposed in edge to edge relationship with their collective facing surfaces making up the facing surface of said smaller sheets, and a backing layer of elastic skin-enclosed synthetic plastic foam material, one skin surface of said plastic material being bonded to the rear surfaces of said facing units.

References Cited

UNITED STATES PATENTS

| 2,018,712 | 10/1935 | Elmendorf | 161—114 |
| 2,924,861 | 2/1960 | Viets | 161—161 |
| 3,003,810 | 10/1961 | Kloote et al. | 161—161 |
| 3,172,072 | 3/1965 | Willy | 264—47 |
| 3,216,849 | 11/1965 | Jacobs | 264—47 |

FOREIGN PATENTS 811,655   4/1959   Great Britain.

ROBERT F. BURNETT, Primary Examiner

W. J. VAN BALEN, Assistant Examiner

U.S. Cl. X.R.

52—309, 587, 715; 181—5; 156—79, 272, 299, 304; 161—39 114, 149, 160, 190; 264—45